(12) United States Patent
Lai

(10) Patent No.: US 6,851,000 B2
(45) Date of Patent: Feb. 1, 2005

(54) SWITCH HAVING FLOW CONTROL MANAGEMENT

(75) Inventor: James Lai, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 369 days.

(21) Appl. No.: 09/808,997

(22) Filed: Mar. 16, 2001

(65) Prior Publication Data

US 2002/0176357 A1 Nov. 28, 2002

Related U.S. Application Data

(60) Provisional application No. 60/237,764, filed on Oct. 3, 2000.

(51) Int. Cl.[7] ............................. G06F 13/18; G06F 3/00
(52) U.S. Cl. ............................... 710/57; 710/29; 710/6; 711/513
(58) Field of Search .................. 710/57, 52, 17–18, 710/29; 711/513; 365/189.05; 370/390

(56) References Cited

U.S. PATENT DOCUMENTS

| | | |
|---|---|---|
| 5,390,173 A | 2/1995 | Spinney et al. |
| 5,414,704 A | 5/1995 | Spinney |
| 5,423,015 A | 6/1995 | Chung |
| 5,459,717 A | 10/1995 | Mullan et al. |
| 5,473,607 A | 12/1995 | Hausman et al. |
| 5,524,254 A | 6/1996 | Morgan et al. |
| 5,535,197 A | 7/1996 | Cotton |
| 5,555,398 A | 9/1996 | Raman |
| 5,568,477 A | 10/1996 | Galand et al. |
| 5,644,784 A | 7/1997 | Peek |
| 5,696,899 A | 12/1997 | Kalwitz |
| 5,748,631 A | 5/1998 | Bergantino et al. |
| 5,781,549 A | 7/1998 | Dai |
| 5,787,084 A | 7/1998 | Hoang et al. |

(List continued on next page.)

FOREIGN PATENT DOCUMENTS

| | | |
|---|---|---|
| EP | 0312917 A2 | 4/1989 |
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |

(List continued on next page.)

OTHER PUBLICATIONS

"A High–Speed CMOS Circuit for 1.2–Gb/s 16×16 ATM Switching," Alain Chemarin et al. 8107 IEEE Journal of Solid–State Circuits 27(1992) Jul., No. 7, New York, US, pp. 1116–1120.

(List continued on next page.)

Primary Examiner—Kim Huynh
(74) Attorney, Agent, or Firm—Sanders, Squire & Dempsey LLP

(57) ABSTRACT

A method of flow control management of data packets in a switch. The method has the steps of determining each time data is being written to memory in order to calculate a memory used amount; determining each time data is being freed from memory in order to calculate a memory freed amount; and calculating how much total memory is being used using the memory freed amount and the memory used amount. A comparison is made comparing the total memory being used to a first predetermined threshold. When the first predetermined threshold is reached a first threshold command is issued indicating that the first predetermined threshold has been reached.

23 Claims, 10 Drawing Sheets

U.S. PATENT DOCUMENTS

| | | | |
|---|---|---|---|
| 5,790,539 A | 8/1998 | Chao et al. | |
| 5,802,287 A | 9/1998 | Rostoker et al. | |
| 5,825,772 A | 10/1998 | Dobbins et al. | |
| 5,828,653 A | 10/1998 | Goss | |
| 5,831,980 A | 11/1998 | Varma et al. | |
| 5,845,081 A | 12/1998 | Rangarajan et al. | |
| 5,887,187 A | 3/1999 | Rostoker et al. | |
| 5,892,922 A | 4/1999 | Lorenz | |
| 5,893,162 A * | 4/1999 | Lau et al. | 711/153 |
| 5,909,686 A | 6/1999 | Muller et al. | |
| 5,987,507 A | 11/1999 | Creedon et al. | |
| 6,011,795 A | 1/2000 | Varghese et al. | |
| 6,041,053 A | 3/2000 | Douceur et al. | |
| 6,052,751 A | 4/2000 | Runaldue et al. | |
| 6,061,351 A | 5/2000 | Erimli et al. | |
| 6,084,856 A | 7/2000 | Simmons et al. | |
| 6,119,196 A | 9/2000 | Muller et al. | |
| 6,167,054 A * | 12/2000 | Simmons et al. | 370/422 |
| 6,175,902 B1 | 1/2001 | Runaldue et al. | |
| 6,178,473 B1 * | 1/2001 | Bonola | 710/54 |
| 6,185,185 B1 | 2/2001 | Bass et al. | |
| 6,269,413 B1 * | 7/2001 | Sherlock | 710/52 |
| 6,535,942 B1 * | 3/2003 | Karlsson et al. | 710/260 |

FOREIGN PATENT DOCUMENTS

| | | |
|---|---|---|
| JP | 4-189023 | 7/1992 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO 00/52858 | 9/2000 |
| WO | WO9900936 A1 | 6/2001 |

OTHER PUBLICATIONS

"Local Area Network Switch Frame Lookup Technique for Increased Speed and Flexibility," 700 IBM Technical Disclosure Bulletin 38 Jul. 1995, No. 7, Armonk, NY, US, pp. 221–222.

"Queue Management for Shared Buffer and Shared Multi-buffer ATM Switches," Yu–Sheng Lin et al., Department of Electronics Engineering & Institute of Electronics, National Chiao Tung University, Hsinchu, Taiwan, R.O.C., Mar. 24, 1996, pp. 688–695.

"A 622–Mb/s 8×8 ATM Switch Chip Set with Shared Multibuffer Architecture," Harufusa Kondoh et al., 8107 IEEE Journal of Solid–State Circuits 28(1993) Jul., No. 7, New York, US, pp. 808–814.

"Catalyst 8500 CSR Architecture," White Paper XP–002151999, Cisco Systems Inc. 1998, pp. 1–19.

"Computer Networks," A.S. Tanenbaum, Prentice–Hall Int., USA, XP–002147300(1998), Sec. 5.2–Sec. 5.3, pp. 309–320.

* cited by examiner

FCM 116

| START POINTER DETERMINER 238 | MEMORY USED CALCULATOR 242 |
| END OF LIST POINTER DETERMINER 240 | |
| FIRST THRESHOLD COMPARER 244 | SECOND THRESHOLD COMPARER 246 |

FIG.2D

SWITCH HAVING FLOW CONTROL MANAGEMENT

REFERENCE TO RELATED APPLICATIONS

This application claims priority to U.S. Provisional Patent Application Ser. No. 60/237,764 filed on Oct. 3, 2000. The contents of this provisional application are hereby incorporated by reference.

BACKGROUND OF THE INVENTION

1. Field of the Invention

The invention relates to a method and apparatus for high performance switching in local area communications networks such as token ring, ATM, ethernet, fast ethernet, and gigabit ethernet environments, generally known as LANs. In particular, the invention relates to a new switching architecture geared to power efficient and cost sensitive markets, and which can be implemented on a semiconductor substrate such as a silicon chip.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic ethernet wirespeed is up to 10 megabits per second, and Fast Ethernet is up to 100 megabits per second. A gigabit Ethernet is capable of transmitting data over a network at a rate of up to 1,000 megabits per second. As speed has increased, design constraints and design requirements have become more and more complex with respect to following appropriate design and protocol rules and providing a low cost, commercially viable solution.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The invention is directed to a switch having flow control management.

The invention in one embodiment is a method of flow control management of data packets in a switch. The method has the steps of determining each time data is being written to memory in order to calculate a memory used amount; determining each time data is being freed from memory in order to calculate a memory freed amount; and calculating how much total memory is being used using the memory freed amount and the memory used amount. Finally a comparison is made comparing the total memory being used to a first predetermined threshold. When the first predetermined threshold is reached a first threshold command is issued indicating that the first predetermined threshold has been reached.

In an alternate embodiment the invention is a method of flow control management of data packets in a switch using linked list memory. The method has the steps of determining which memory address a start pointer is pointing to, wherein the start pointer points to the next memory location in a linked list to be read from memory. A determination is then made determining which memory address an end of list pointer is pointing to, wherein the end of list pointer points to the last memory location in the linked list. A calculation is then made calculating from the start pointer and the end of list pointer how many memory addresses are being used by said linked list to determine a total amount of memory being used. A comparison is then made comparing the total amount of memory being used to a first predetermined threshold, wherein when the first predetermined threshold is reached a first threshold command is issued indicating that the first predetermined threshold has been reached.

In another embodiment, the invention is a switch. The switch has a bus, a memory interface connected to the bus and to a memory, and a receive port connected to the bus. The receive port receives data packets for transmission to the memory through the bus and the memory interface. A transmit port is also connected to the bus. The transmit port transmits data packets from the memory through the transmit port out of the switch. There is also a flow control manager connected to the bus. The flow control manager has a bus monitor that determines when the data packets are being transmitted to the memory and when the data packets are being transmitted from the memory to the transmit port. There is also a counter that is incremented each time data packets are transmitted to said memory and decremented each time data packets are transmitted from the memory to the transmit port. The counter indicates a memory being used value. There is also a first comparator that compares the counter to a first predetermined threshold, wherein when the counter meets the first predetermined threshold a first threshold command is transmitted across the bus.

In an alternate embodiment, the invention is a switch using linked list memory. The switch has a bus and a memory interface connected to the bus and to a memory. A receive port is connected to the bus. The receive port receives data packets for transmission to the memory through the bus and the memory interface. A transmit port is connected to the bus. The transmit port transmits data packets from the memory through the transmit port out of the switch. The switch also has a flow control manager connected to the bus. The flow control manager has a start pointer determiner that determines which memory address a start pointer is pointing to, wherein the start pointer points to the next memory location in a linked list to be read from memory. The flow control manager also has an end of list pointer determiner that determines which memory address an end of list pointer is pointing to, wherein the end of list pointer points to the last memory location in the linked list. A memory used calculator determines how many memory addresses are being used by the linked list to determine a total amount of memory being used. A first comparator compares the total amount of memory being used to a first predetermined threshold. When the total amount of memory being used meets the first predetermined threshold, a first threshold command is transmitted across said bus.

BRIEF DESCRIPTION OF THE DRAWINGS

The objects and features of the invention will be more readily understood with reference to the following description and the attached drawings, wherein:

FIG. 2D is a block diagram of a Flow Control Manager in another embodiment of the invention.

DETAILED DESCRIPTION OF THE INVENTION

Figure 1A:
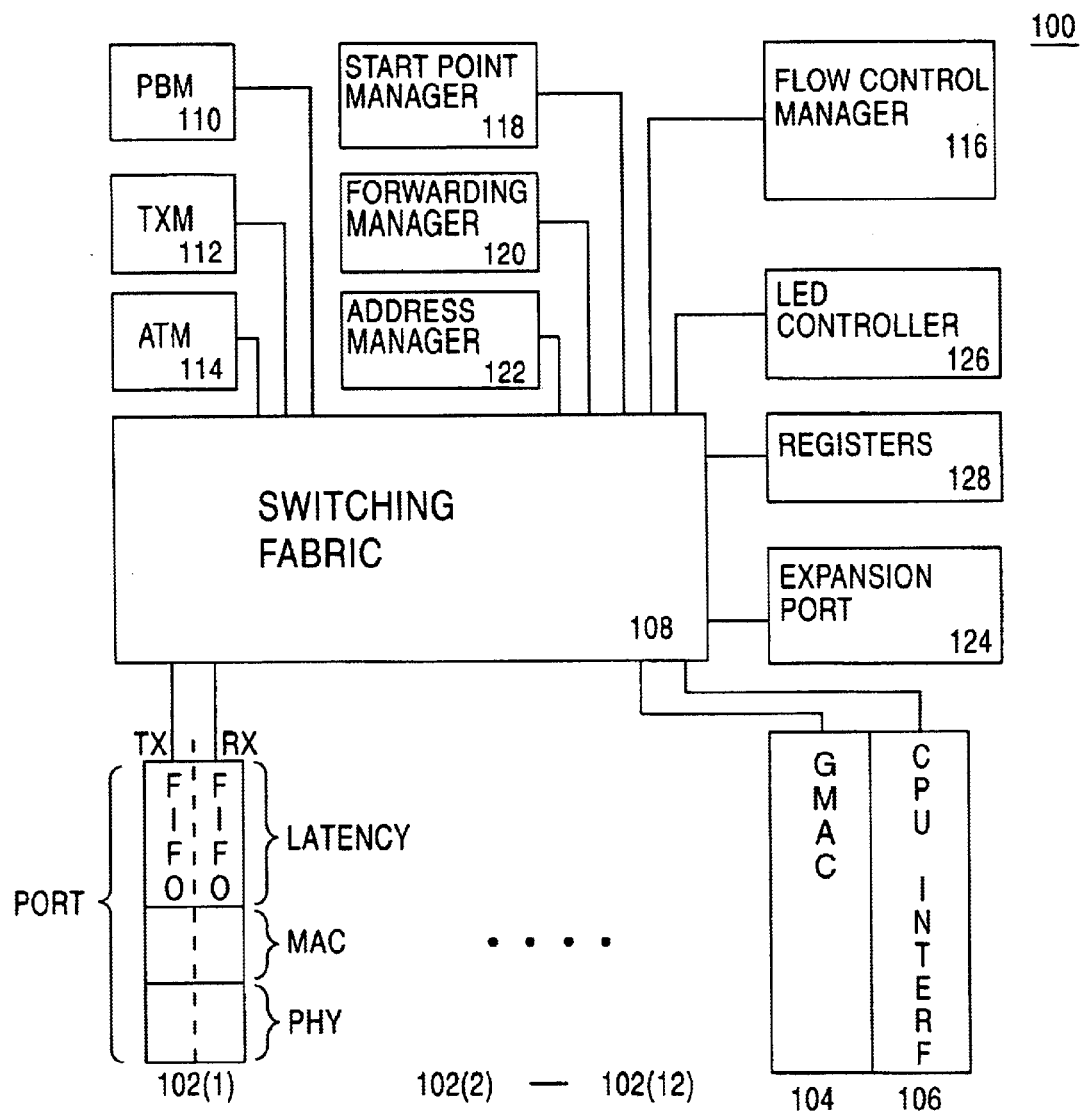
FIG. 1A is a general block diagram of elements of the present invention.

FIG. 1A is an example of a block diagram of a switch 100 of the present invention. In this example, switch 100 has 12 ports, 102(1)–102(12), which can be fully integrated IEEE compliant ports. Each of these 12 ports 102(1)–102(12) can be 10BASE-T/100BASE-TX/FX ports each having a physical element (PHY), which can be compliant with IEEE standards. Each of the ports 102(1)–102(12), in one example of the invention, has a port speed that can be forced to a particular configuration or set so that auto-negotiation will determine the optimal speed for each port independently. Each PHY of each of the ports can be connected to a twisted-pair interface using TXOP/N and RXIP/N as transmit and receive protocols, or a fiber interface using FXOP/N and FXIP/N as transmit and receive protocols.

Each of the ports 102(1)–102(12) has a Media Access Controller (MAC) connected to each corresponding PHY. In one example of the invention, each MAC is a fully compliant IEEE 802.3 MAC. Each MAC can operate at 10 Mbps or 100 Mbps and supports both a full-duplex mode, which allows for data transmission and reception simultaneously, and a half duplex mode, which allows data to be either transmitted or received, but not both at the same time.

Flow control is provided by each of the MACs. When flow control is implemented, the flow of incoming data packets is managed or controlled to reduce the chances of system resources being exhausted. Although the present embodiment can be a non-blocking, wire speed switch, the memory space available may limit data transmission speeds. For example, during periods of packet flooding (i.e. packet broadcast storms), the available memory can be exhausted rather quickly. In order to enhance the operability of the switch in these types of situations, the present invention can implement two different types of flow control. In full-duplex mode, the present invention can, for example, implement the IEEE 802.3x flow control. In half-duplex mode, the present invention can implement a collision backpressure scheme.

In one example of the present invention each port has a latency block connected to the MAC. Each of the latency blocks has transmit and receive FIFOs which provide an interface to main packet memory. In this example, if a packet does not successfully transmitted from one port to another port within a preset time, the packet will be dropped from the transmit queue.

In addition to ports 102(1)–102(12), a gigabit interface 104 can be provided on switch 100. Gigabit interface 104 can support a Gigabit Media-Independent Interface (GMII) and a Ten Bit Interface (TBI). The GMII can be fully compliant to IEEE 802.3ab, which only supports full duplex operation. The GMII can pass data at a rate of 8 bits every 8 ns resulting in a throughput of 2 Gbps including both transmit and receive data. In addition to the GMII, gigabit interface 104 can be configured to be a TBI, which is compatible with many industry standard fiber drivers. Since in some embodiments of the invention the MDIO/MDC interfaces (optical interfaces) are not supported, the gigabit PHY (physical layer) is set into the proper mode by the system designer.

Gigabit interface 104, like ports 102(1)–102(12), has a PHY, a Gigabit Media Access Controller (GMAC) and a latency block. The GMAC can be a fully compliant IEEE 802.3z MAC operating at 1 Gbps full-duplex only and can connect to a fully compliant GMII or TBI interface through the PHY. In this example, GMAC 108 provides full-duplex flow control mechanisms and a low cost stacking solution for either twisted pair or TBI mode using in-band signaling for management. This low cost stacking solution allows for a ring structure to connect each switch utilizing only one gigabit port.

A CPU interface 106 is provided on switch 100. In one example of the present invention, CPU interface 106 is an asynchronous 8 or 16 bit I/O device interface. Through this interface a CPU can read internal registers, receive packets, transmit packets and allow for interrupts. CPU interface 106 also allows for a Spanning Tree Protocol to be implemented. In one example of the present invention, a chip select pin is available allowing a single CPU control two switches. In this example an interrupt pin when driven low (i.e., driven to the active state) requiring a pull-up resistor will allow multiple switches to be controlled by a single CPU.

A switching fabric 108 is also located on switch 100 in one example of the present invention. Switching fabric 108 can allow for full wire speed operation of all ports. A hybrid shared memory approach can also be implemented to minimize bandwidth and memory requirements. This architecture allows for efficient and low latency transfer of packets through the switch and also supports address learning and aging features, VLAN, port trunking and port mirroring.

Memory interfaces 110, 112 and 114 can be located on switch 100 and allow for the separation of data and control information. Packet buffer memory interface (PBM) 110 handles packet data storage while the transmit queue memory interface (TXM) 112 keeps a list of packets to be transmitted and address table/control memory interface (ATM) 114 handles the address table and header information. Each of these interfaces can use memory such as SSRAM that can be configured in various total amounts and chip sizes.

PBM 110 is located on switch 100 and can have an external packet buffer memory (not shown) that is used to store the packet during switching operations.

In one example of the invention, packet buffer memory is made up of multiple 256 byte buffers. Therefore, one packet may span several buffers within memory. This structure allows for efficient memory usage and minimizes bandwidth overhead. The packet buffer memory can be configurable so that up to 4 Mbytes of memory per chip can be used for a total of 8 Mbytes per 24+2 ports. In this example, efficient memory usage is maintained by allocating 256 byte blocks, which allows storage for up to 32K packets. PBM 110 can be 64 bits wide and can use either a 64 bit or 32 bit wide memory and can run at 100 MHz.

TXM 112 is located on switch 100 and can have an external transmit queue memory (not shown). TXM 112, in this example, maintains 4 priority queues per port and allows for 64K packets per chip and up to 128K packets per system. TXM 112 can run at a speed of up to 100 MHz.

ATM 114 can be located on switch 100 and can have an external address table/control memory (not shown) used to store the address table and header information corresponding to each 256 byte section of PBM 110. Address table/control memory allows up to 16K unique unicast addresses. The remaining available memory can be used for control information. ATM 114, in this example, runs up to 133 MHz.

Switch 100, in one example of the invention, has a Flow Control Manager 116 that manages the flow of packet data. As each port sends more and more data to the switch, Flow Control Manager 116 can monitor the amount of memory being used by each port 102(1)–102(12) of switch 100 and the switch as a whole. In this example, if one of the ports 102(1)–102(12) or the switch as a whole is using up too much memory as is predetermined by a register setting predefined by the manufacturer or by a user, Flow Control Manager 116 will issue commands over the ATM Bus requesting the port or switch to slow down and may eventually drop packets if necessary.

In addition to Flow control manager 116, switch 100 also has a Start Point Manager (SPM) 118 connected to Switching Fabric 108, a Forwarding Manager (FM) 120 connected to Switching Fabric 108 and an Address Manager (AM) 122 connected to Switching Fabric 108.

Start Point Manager (SPM) 118, through Switching Fabric 108 in one example of the present invention, keeps track of which blocks of memory in PBM 110 are being used and which blocks of memory are free.

Forwarding Manager 120 can forward packet data through Switching Fabric 108 to appropriate ports for transmission.

Address Manager (AM) 122 can, through Switching Fabric 108, manage the address table including learning source addresses, assigning headers to packets and keeping track of these addresses. In one example of the invention, AM 122 uses aging to remove addresses from the address table that have not been used for a specified time period or after a sequence of events.

An expansion port 124 can also be provided on switch 100 to connect two switches together. This will allow for full wire speed operation on twenty-five 100 M ports (includes one CPU port) and two gigabit ports. The expansion port 124, in this example, allows for 4.6 Gbps of data to be transmitted between switches.

An LED controller 126 can also be provided on switch 100. LED controller 126 activates appropriate LEDs to give a user necessary status information.

Each port of the ports 102(1)–102(12), in one example of the invention, has 4 separate LEDs, which provide per port status information. The LEDs are fully programmable and are made up of port LEDs and other LEDs. Each LED can include a default state for each of the four port LEDs. An example of the default operation of each of the port LEDs are shown below.

| LED | DEFAULT OPERATION |
|---|---|
| 0 | Speed Indicator<br>OFF = 10 Mbps or no link<br>ON = 100 Mbps |
| 1 | Full/Half/Collision Duplex<br>OFF = The port is in half duplex or no link<br>BLINK = The port is in half duplex and a collision has occurred<br>ON = The port is in full duplex |
| 2 | Link/Activity Indicator<br>OFF = Indicates that the port does not have link<br>BLINK = Link is present and receive or transmit activity is occurring on the media<br>ON = Link present without activity |
| 3 | Alert Condition<br>OFF = No alert conditions, port is operating normally<br>ON = The port has detected an isolate condition |

In addition to the default operations for the port LEDs, each of the port LEDs can be programmed through registers. These registers can be set up, in one example of the invention, by a CPU. By having programmable registers that control LEDs, full customization of the system architecture can be realized including the programmability of the blink rate.

Each of the LEDs can have a table, as shown below, associated with the LED, where register bits $R_{Ax}$, $R_{Bx}$ and $R_{Cx}$ can be set to provide a wide range of information.

| Event | ON Condtion | BLINK Condition | OFF Condition |
|---|---|---|---|
| Link (L) | $A_0 = (R_{A0}\&L)|!R_{A0}$ | $B_0 = (R_{B0}\&L)|!R_{B0}$ | $C_0 = (R_{C0}\&L)|!R_{C0}$ |
| Isolate (I) | $A_1 = (R_{A1}\&I)|!R_{A1}$ | $B_1 = (R_{B1}\&I)|!R_{B1}$ | $C_1 = (R_{C1}\&I)|!R_{C1}$ |
| Speed (S) | $A_2 = (R_{A2}\&S)|!R_{A2}$ | $B_2 = (R_{B2}\&S)|!R_{B2}$ | $C_2 = (R_{C2}\&S)|!R_{C2}$ |
| Duplex (D) | $A_3 = (R_{A3}\&D)|!R_{A3}$ | $B_3 = (R_{B3}\&D)|!R_{B3}$ | $C_3 = (R_{C3}\&D)|!R_{C3}$ |
| TX/RX Activity (TRA) | $A_4 = (R_{A4}\&TRA)|!R_{A4}$ | $B_4 = (R_{B4}\&TRA)|!R_{B4}$ | $C_4 = (R_{C4}\&TRA)|!R_{C4}$ |
| TX Activity (TA) | $A_5 = (R_{A5}\&TA)|!R_{A5}$ | $B_5 = (R_{B5}\&TA)|!R_{B5}$ | $C_5 = (R_{C5}\&TA)|!R_{C5}$ |
| RX Activity (RA) | $A_6 = (R_{A6}\&RA)|!R_{A6}$ | $B_6 = (R_{B6}\&RA)|!R_{B6}$ | $C_6 = (R_{C6}\&RA)|!R_{C6}$ |
| Auto-Negotiate Active (N) | $A_7 = (R_{A7}\&N)|!R_{A7}$ | $B_7 = (R_{B7}\&N)|!R_{B7}$ | $C_7 = (R_{C7}\&N)|!R_{C7}$ |
| Port Disabled (PD) | $A_8 = (R_{A8}\&PD)|!R_{A8}$ | $B_8 = (R_{B8}\&PD)|!R_{B8}$ | $C_8 = (R_{C8}\&PD)|!R_{C8}$ |
| Collision © | $A_9 = (R_{A9}\&C)|!R_{A9}$ | $B_9 = (R_{B9}\&C)|!R_{B9}$ | $C_9 = (R_{C9}\&C)|!R_{C9}$ |
| Result | $LED_{ON} = (A_0\&A_1\&A_2\&A_3 \&A_4\&A_5\&A_6\&A_7\&A_8\& A_9)\&(\overline{LED_{BLINK}\&LED_{OFF}})$ | $LED_{BLINK} = (B_0\&B_1\&B_2\&B_3 \&B_4\&B_5\&B_6\&B_7\&B_8\& B_9)\&(\overline{LED_{OFF}})$ | $LED_{OFF} = (C_0\&C_1\&C_2\& C_3\&C_4\&C_5\&C_6\&C_7\&C_8 \&C_9)$ |

For example, register bits $R_{Ax}$, $R_{Bx}$ and $R_{Cx}$ can be set to determine when $LED_{ON}$, $LED_{BLINK}$ and $LED_{OFF}$ are activated or deactivated. In addition to the port LEDs, there are additional LEDs which indicate the status of the switch.

Registers 128 are located on switch 100 in this example of the present invention. Registers 128 are full registers that allow for configuration, status and Remote Monitoring (RMON) management. In this example, Registers 128 are arranged into groups and offsets. There are 32 address groups each of which can contain up to 64 registers.

Figure 1B:
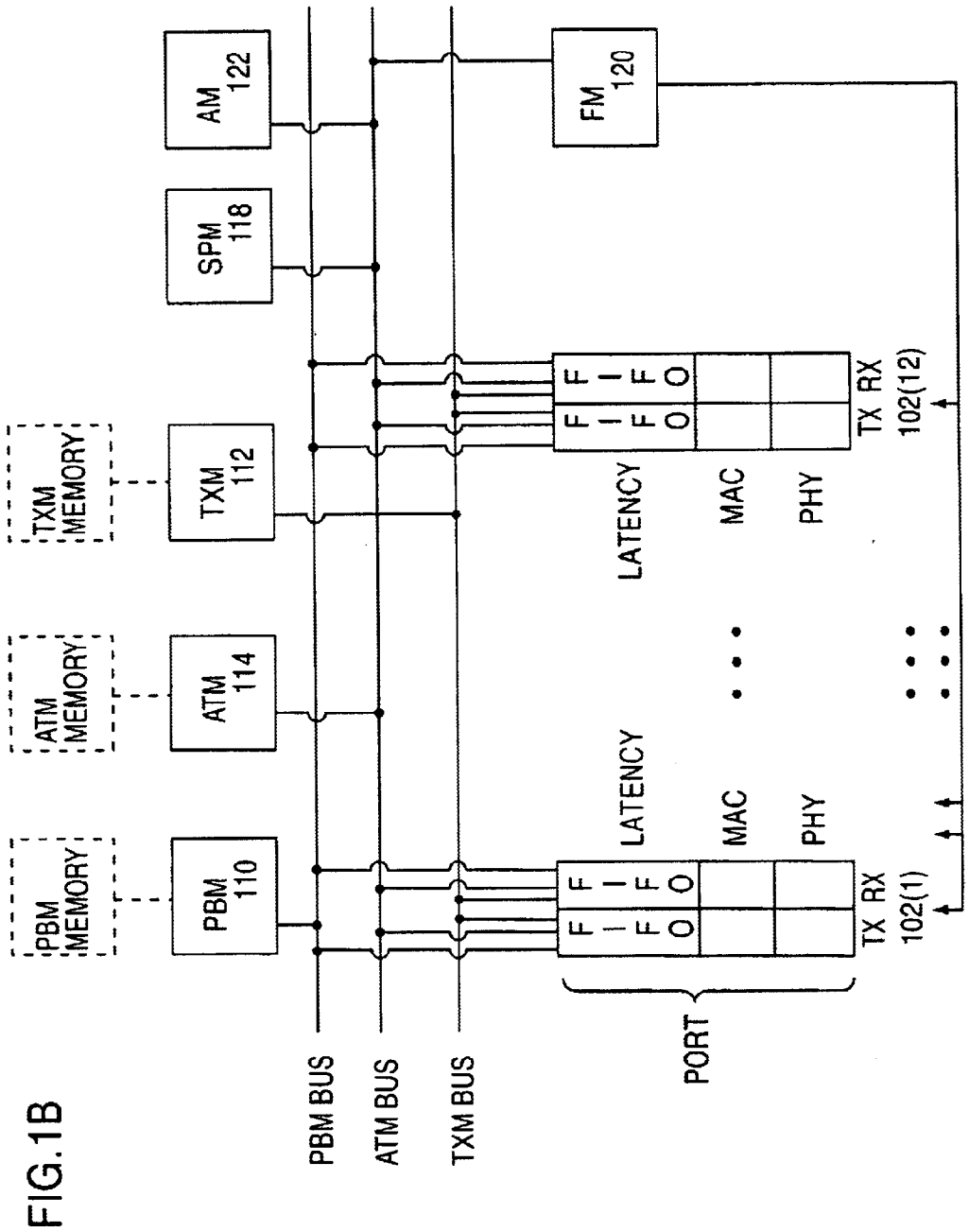
FIG. 1B illustrates the data flow on the CPS channel of a network switch according to the present invention.

FIG. 1B is an illustration of one embodiment of the invention having a PBM Bus, an ATM Bus, and a TXM Bus for communications with other portions of the switch. In this example PBM 110 is connected to the PBM Bus and an external PBM Memory; TXM 112 is connected to the TXM Bus and an external TXM Memory; and ATM 114 is connected to the ATM Bus and an external ATM Memory. Each of the transmit (TX) and receive (RX) portions of ports 102(1)–102(12) are connected to the PBM Bus, ATM Bus and TXM Bus for communications with other components of the switch.

FM 120 is connected to each of the ports 102(1)–102(12) directly and is also connected to the ATM Bus for communications with other portions of the switch. FCM 116, SPM 118 and AM 122 are also connected to the ATM Bus for communications with other portions of the switch.

The operation of switch 100 for transmission of a unicast packet (i.e., a packet destined for a single port for output) in one example of the invention is made with reference to FIG. 1B as follows.

In this example, Switch 100 is initialized following the release of a hardware reset pin. A series of initialization steps will occur, including the initialization of external buffer memory and the address table. All ports on the switch will then be disabled and the CPU can then enable packet traffic by setting an enable register. As links become available on the ports (ports 102(1)–102(12) and gigabit port 104), an SPT protocol will confirm these ports and the ports will become activated. After the initialization process is concluded normal operation of Switch 100 can begin.

In this example, once a port has been initialized and activated, a PORT_ACTIVE command is issued by CPU. This indicates that the port is ready to transmit and receive data packets. If for some reason a port goes down or becomes disabled, a PORT_INACTIVE command is issued by the CPU.

During unicast transmission, a packet from an external source on port 102(1) is received at the receive (RX) PHY of port 102(1).

The RX MAC of port 102(1) will typically not start processing the packet until a Start of Frame Delimiter (SFD) for the packet is detected. When the SFD is detected by the RX MAC portion of port 102(1), the RX MAC will place the packet into a receive (RX) FIFO of the latency block of port 102(1). As the RX FIFO becomes filled, port 102(1) will request to send a message over the ATM Bus to Address Manager (AM) 122 for an empty receive buffer. Once access to the ATM Bus is granted, the RX FIFO Latency block of port 102(1) sends packets received in the RX FIFO to the external PBM Memory through the PBM Bus and PBM 110 until the end of packet is reached.

The PBM Memory, in this example, is made up of 256 byte buffers.

Therefore, one packet may span several buffers within the packet buffer memory if the packet size is greater than 256 bytes. Connections between packet buffers can be maintained through a linked list system in one example of the present invention. A linked list system allows for efficient memory usage and minimized bandwidth overhead and will be explained in further detail with relation to FIG. 3A–FIG. 3D.

At the same time packets are being sent to the external PBM Memory, the port will also send the source address to Address Manager (AM) 122 and request a filtering table from AM 122.

If the packet is "good", as is determined through normal, standard procedures known to those of ordinary skill in the art, such as hashing functions or IEEE standard packet checking such as a Cyclic Redundancy Check (CRC), the port writes the header information to the ATM memory through the ATM Bus and ATM 114. AM 122 sends a RECPE_COMPL command over the ATM Bus signifying that packet reception is complete. Other information is also sent with the RECEP_COMPL command such as the start address and filtering table which indicates which ports the packet is to be sent out on. For example, a filtering table having a string such as "011111111111" would send the packet to all ports except port 1 and would have a count of 11. The count simply is the number of ports the packet is to be sent, as indicated by the number of "1"s.

Forwarding Manager (FM) 120 is constantly monitoring the ATM Bus to determine if a RECEP_COMPL command has been issued. Once FM 120 has determined that a RECEP_COMPL command has been issued, Forwarding Manager (FM) 120 will use the filtering table to send packets to appropriate ports. It is noted that a packet will not be forwarded if one of the following conditions is met:

a. The packet contains a CRC error
b. The PHY signals a receive error
c. The packet is less than 64 bytes
d. The packet is greater than 1518 bytes or 1522 bytes depending on register settings
e. The packet is only forwarded to the receiving port If FM 120 detects a RECEP_COMPL command on the ATM Bus, FM 120 will decide if the packet is intended to be transmitted to one of its ports. The RECEP_COMPL command includes information such as a filter table, a start pointer, priority information and other miscellaneous information. FM 120 will read the filter table to determine if the packet is to be transmitted from one of its ports. If it is determined that the packet is to be transmitted from one of its ports, FM 120 will send the RECEP_COMPL command information directly to the port.

In this case, the RECEP_COMPL command information is sent to the TX FIFO of port 102(12).

If the port is busy, the RECEP_COMPL command information is transferred to TXM Memory through the TXM Bus and TXM 112. The TXM memory contains a queue of packets to be transmitted. TXM Memory is allocated on a per port basis so that if there are ten ports there are ten queues within the TXM Memory allocated to each port. As each of the ports transmitters becomes idle, each port will read the next RECEP_COMPL command information stored in the TXM Memory. The TX FIFO of port 102(12) will receive, as part of the RECEP_COMPL command information, a start pointer which will point to a header in ATM memory across the ATM Bus which in turn points to the location of a packet in the PBM Memory over the PBM Bus. The port will at this point request to load the packet into the transmit (TX) FIFO of port 102(12) and send it out through the MAC and PHY of port 102(12).

If the port is in half duplex mode, it is possible that a collision could occur and force the packet transmission to start over. If this occurs, the port simply re-requests the bus master and reloads the packet and starts over again. If however, the number of consecutive collisions becomes excessive, the packet will be dropped from the transmission queue.

Once the port successfully transmits a packet, the port will signal FM 120 that it is done with the current buffer. FM 120 will then decrement a counter which indicates how many more ports must transmit the packet. For example, if a packet is destined to eleven ports for output, the counter, in this example, is set to 11. Each time a packet is successfully transmitted, FM 120 decrements the counter by one. When the counter reaches zero this will indicate that all designated ports have successfully transmitted the packet. FM 120 will then issue a FREE command over the ATM Bus indicating that the memory occupied by the packet in the PBM Memory is no longer needed and can now be freed for other use.

When SPM 118 detects a FREE command over the ATM Bus, steps are taken to indicate that the space taken by the packet is now free memory.

Flow Control Manager, FCM 116 is connected to the ATM Bus and monitors the ATM Bus to determine how much memory is being used to store data and how much memory is free for storing data. Based on this information, FCM 116 can send commands to each port, informing the port as to whether the port is using too much memory or whether the total memory is almost full. In either case FCM 116 sends a command to the port requesting that the port slow down the sending of packet data to memory. If the memory becomes too full, FCM 116 can send a command over the ATM Bus notifying AM 122 to start dropping packet data because memory is too full.

In one example of the invention, FCM 116 monitors RECEP_COMPL commands and FREE commands that are issued over the ATM Bus. When a RECEP_COMPL command is issued, this signifies that memory is being used. Therefore, memory is being used and FCM 116 can increment a counter indicating that a memory location is being used. However, if a FREE command is detected on the ATM Bus, memory is being freed for use and FCM 116 can decrement a counter indicating that a memory location is being freed for future use.

Thresholds can be set through the registers of the switch. For example a low threshold of 80% can be set in one of the registers in the switch for the PBM Memory to indicate when FCM 116 should send a command to the ports when to slow down the sending of packet data to memory and a high threshold of 90% can be set in another register in the switch for the PBM Memory to indicate when FCM 116 should send a command to AM 122 to start dropping packets.

As FCM 116 counts the RECEP_COMPL commands and the FREE commands a comparison can be made between the count and the total PBM Memory being used. For example, if the PBM Memory has 1000 memory locations and the count is 600, then 60% (600/1000) of the PBM Memory is being used. If the count is 800, then 80% of the PBM Memory is being used. Since this is the low threshold, FCM 116 will issue a command over the ATM Bus to the ports indicating that the ports should begin to slow down the sending of packet data to memory because memory is becoming full.

If the FCM 116 count increases to 900, 90% (900/1000) of the PBM Memory is being used. The FCM will then issue a command over the ATM Bus to AM 122 to start dropping packet data. In one embodiment of the invention, packet data will continue to be dropped until the amount of PBM Memory falls below the lower threshold of 80% in this example.

In one embodiment of the invention flow control can be implemented for PBM Memory. For example, an upper and lower threshold can be set for the total amount of memory being used in the PBM Memory and an upper and lower threshold can be set based on how much memory each port is using.

In one embodiment of the invention, an upper threshold of 98% can be set for the total PBM Memory and a lower threshold of 90% can be set for the total PBM Memory. Thus, when the total amount of memory being used reaches 90%, FCM 116 will issue a command over the ATM Bus to the ports indicating that total PBM Memory is almost gone and that the ports should slow down the sending of packet data to PBM Memory. If the upper threshold of 98% is reached, FCM 116 will send a command to AM 122 indicating that PBM Memory is too full and that packet data must be dropped. Packet data, in this example, will continue to be dropped until the lower threshold of 90% is reached.

In other embodiments of the invention upper and lower thresholds can be set on a per port basis. For example, an upper and lower threshold can be set on a per port basis for the PBM Memory. If the lower threshold is set to 50%, this would mean that if any single port used 50% or more of the PBM Memory, FCM 116 would issue a command over the ATM Bus to the port indicating that the port is using too much PBM Memory and that the port should slow down the sending of packet data for storage in the PBM Memory. If the upper threshold was set to 65%, this would mean that if any single port used 65% or more of the PBM Memory, FCM 116 will issue a command over the ATM Bus to AM 122 to drop any packet data being sent by the port using 65% of the PBM Memory.

For other types of memories, the operation of FCM 116 can vary. For example, the TXM Memory can be split up so that each port has a specified amount of memory. The TXM Memory can be an ordered list of packets that need to be transmitted. A first pointer would point to the next packet in the list that is to be transmitted and a second pointer can point to the last packet in the list. Thus, the amount of TXM Memory is being used by a port can be calculated by calculating the difference between the first pointer and second pointer. For example, if there are ten memory locations and pointer one points to location three and pointer two points to location six, this would indicate that the list is taking up four memory locations, location three, four, five and six. Therefore instead of counting the number of RECEP COMPL commands and FREE commands are transmitted over the ATM Bus, the amount of memory being used can be calculated by using pointers.

Figure 2A:
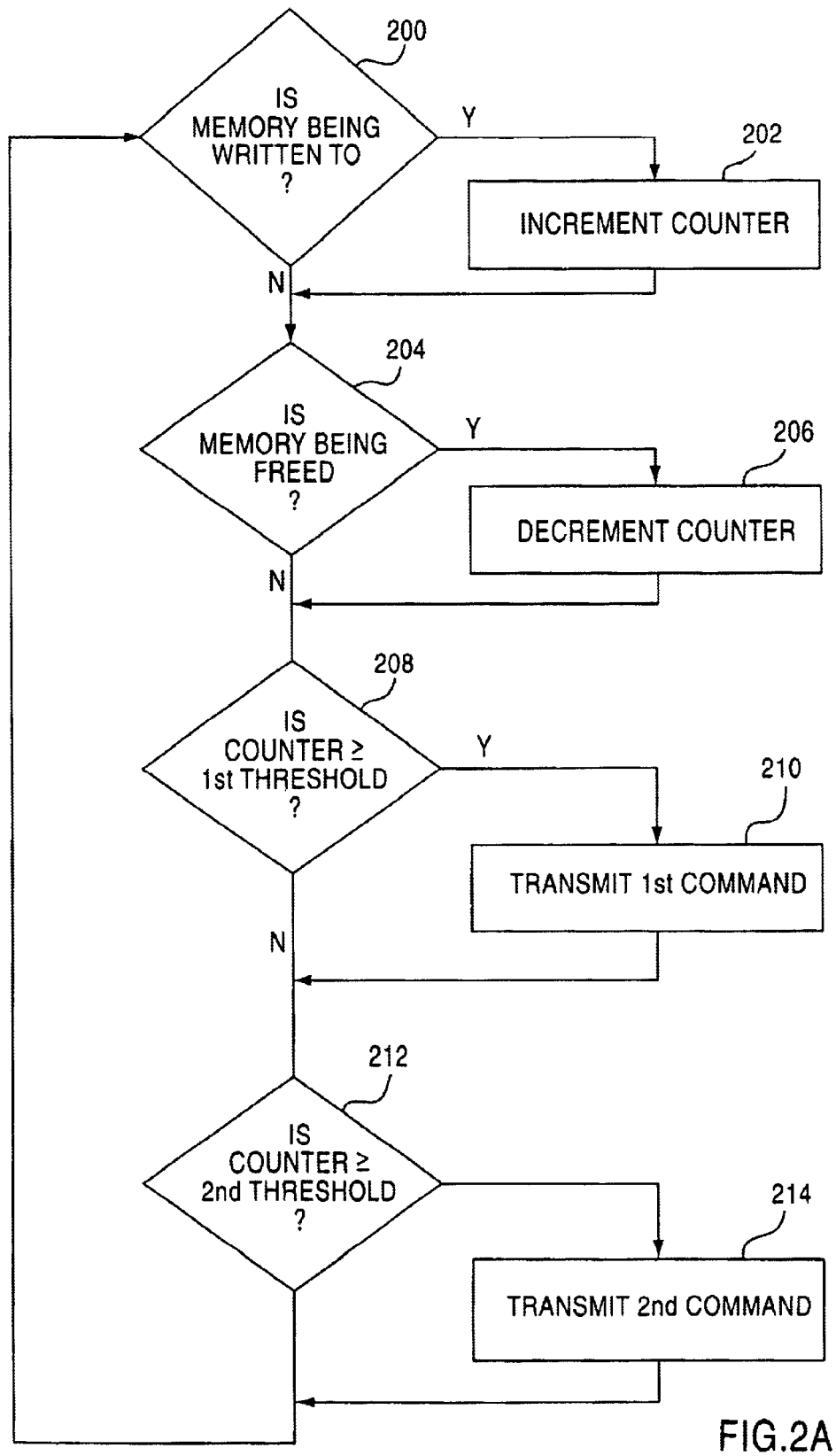
FIG. 2A is a flow diagram of one embodiment of the invention.

FIG. 2A illustrates the steps taken by FCM 116 in one embodiment of the invention. In step 200 FCM 116 determines whether memory is being written to.

If memory is being written to, a counter indicating the total amount of memory being used is incremented in step 202.

In step 204 FCM 116 determines whether memory is being freed. As previously discussed, memory can be considered as being freed once all ports that are intended to transmit a data packet stored in a memory location have transmitted the data packet. If memory is being freed the counter is decremented in step 206.

In step 208, the counter is compared to a first threshold amount. For example as previously discussed, the first threshold can be set as an indication that memory is becoming full. If the counter meets the first threshold amount a first command is transmitted in step 210. This command can be a command transmitted across the ATM Bus to a port requesting that the port slow down data packet transmission to be stored in PBM Memory.

In step 212, the counter is compared to a second threshold amount. For example, as previously discussed, the second threshold can be set as an indication that memory is too full and data packets will be dropped. If the second threshold amount is met, a second command is transmitted in step 214 indicating that packets will be dropped.

Figure 2B:
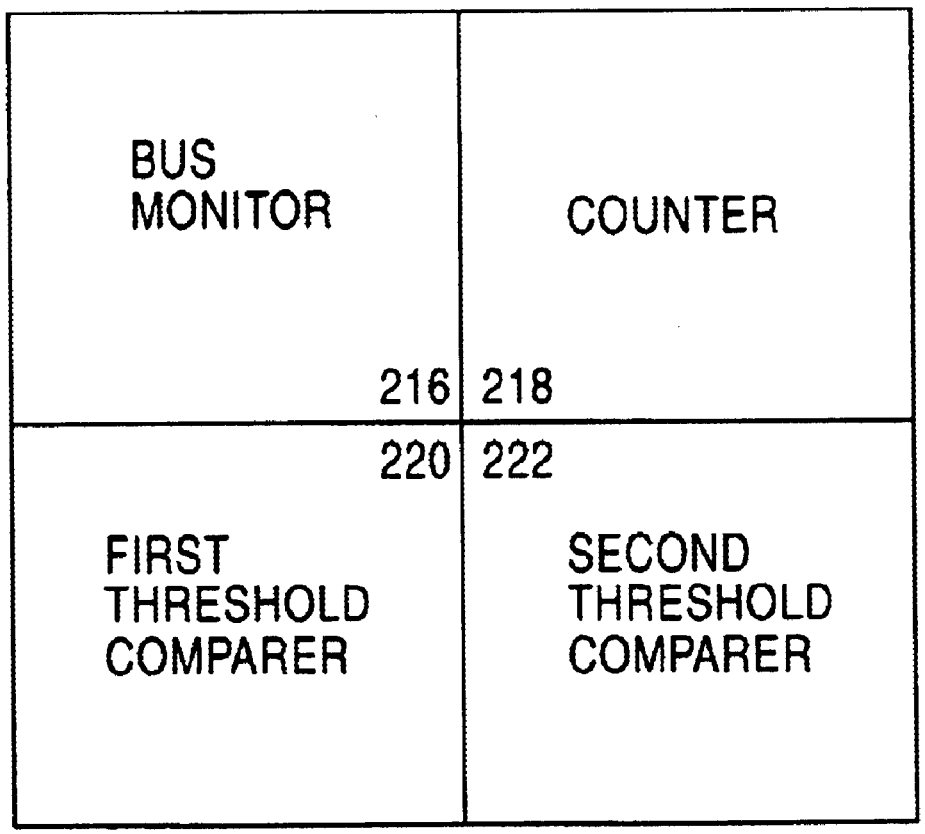
FIG. 2B is a block diagram of a Flow Control Manager in one embodiment of the invention.

FIG. 2B is an illustration of one embodiment of FCM 116. In this embodiment, FCM 116 has a Bus Monitor 216 that can monitor the ATM Bus for RECEP_COMPL commands, which indicate that data packets are being written to memory. Bus Monitor 216 can also monitor the ATM Bus for FREE commands, which indicate that data packets no longer need to be stored in memory.

Counter 218 can be incremented each time Bus Monitor 216 detects a RECEP_COMPL command and can be decremented each time Bus Monitor 216 detects a FREE command. Counter 218 will indicate the amount of total memory being used.

First Threshold Comparator 220 compares Counter 218 to a first threshold. If Counter 218 meets the first threshold a command can be sent across the ATM Bus to a port indicating that memory is becoming full.

Second Threshold Comparator 222 compares Counter 218 to a second threshold. If Counter 218 meets the second threshold a command can be sent across the ATM Bus to a port indicating that data packets will be dropped.

Multicast and broadcast packets are handled exactly like unicast packets with the exception that their filter tables will indicate that all or most ports should transmit the packet. This will force the forwarding managers to transmit the packet out on all or most of their ports.

Figure 2C:
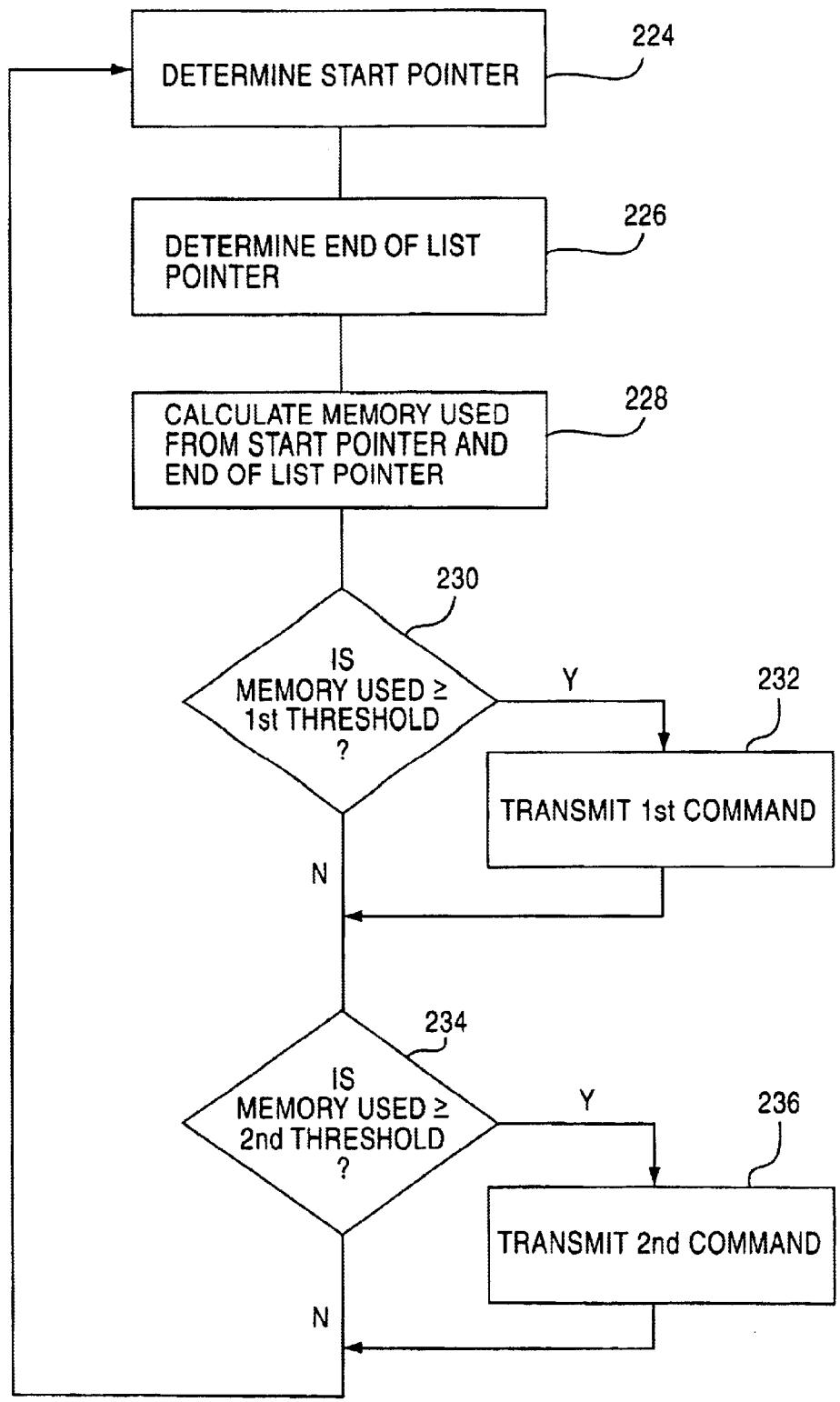
FIG. 2C is a flow diagram of another embodiment of the invention.

FIG. 2C is an alternate embodiment of the invention illustrating the steps that can be taken by FCM 116 when using linked list memory (a discussion of linked list memory is made below with reference to FIGS. 3A–3D).

In step 224 a determination is made of which memory address a start pointer (i.e. free_head) is pointing to.

In step 226 a determination is made of which memory address an end of list pointer (i.e. free_tail) is pointing to.

In step 228 the amount of memory being used can be calculated using the start pointer and the end of list pointer. For example, the difference between start pointer and the end of list pointer can be used to determine the amount of memory being used.

In step 230 the amount of memory being used can be compared to a first threshold amount. If the memory being used meets the first threshold, a command can be transmitted in step 232 over the ATM Bus to the port indicating that memory is becoming full and that the port should slow down the sending of data packets to memory.

In step 234 the amount of memory being used can be compared to a second threshold amount. If the memory being used meets the second threshold, a command can be transmitted in step 236 over the ATM Bus to the port indicating that memory is full and that data packets being sent to memory are going to be dropped.

FIG. 2D is an illustration of one embodiment of FCM 116. In this embodiment, FCM 116 has a Start Pointer Determiner 238 that keeps track of which memory location the start pointer is pointing to. An End of List Determiner 240 keeps track of which memory location the end of list pointer is pointing to. In order to determine how much memory is being used by the switch a Memory Used Calculator 242 determines how much memory is being used by determining the difference between the start pointer and the end of list pointer.

First Threshold Comparator 244 compares the amount of memory being used to a first threshold. If the memory being used meets the first threshold, a command can be transmitted over the ATM Bus to the port indicating that memory is becoming full and that the port should slow down the sending of data packets to memory.

Second Threshold Comparator 246 compares the amount of memory being used to a second threshold. If the memory being used meets the second threshold, a command can be transmitted over the ATM Bus to the port indicating that memory is full and that data packets being sent to memory are going to be dropped.

Figure 3A:
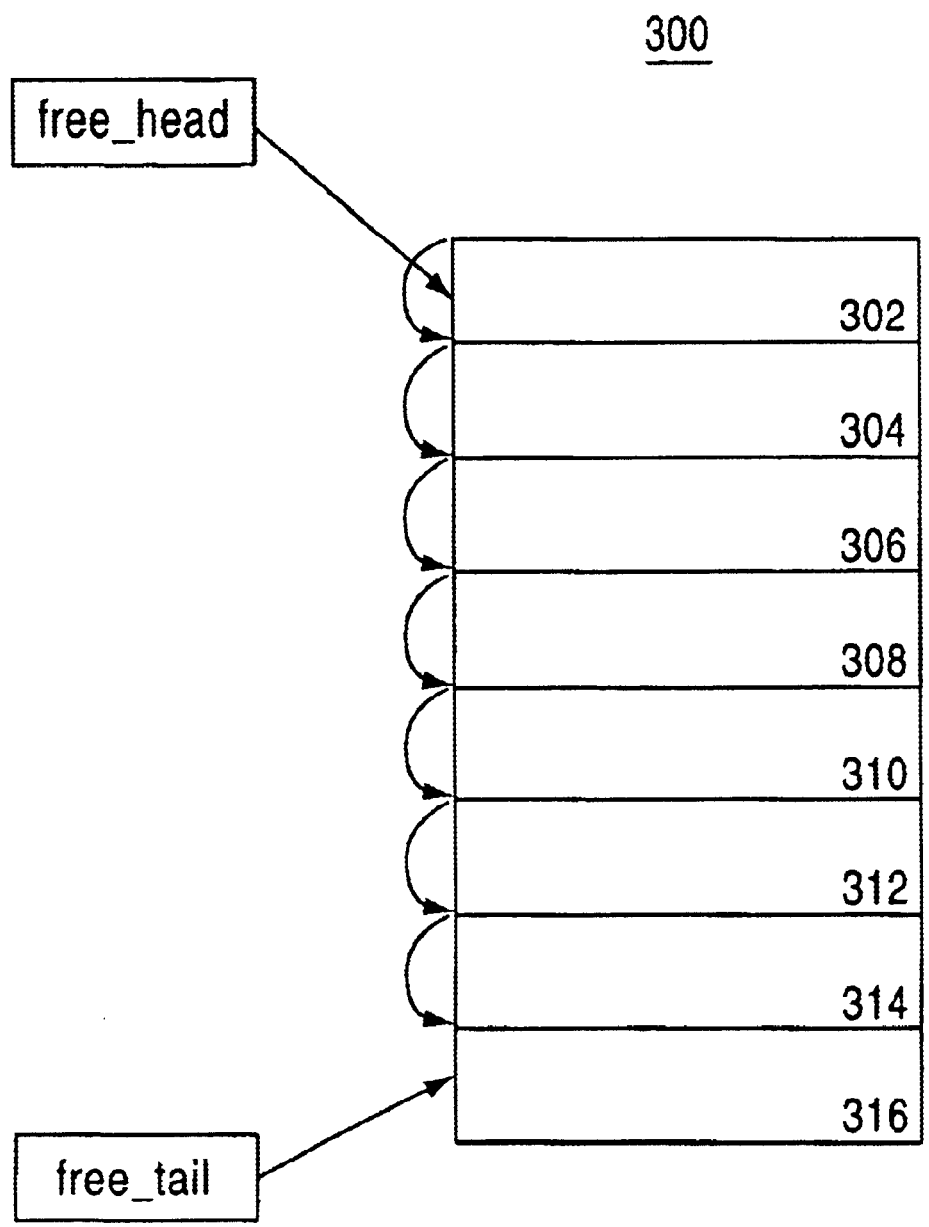
FIG. 3A illustrates a linked list structure of Packet Buffer Memory.

FIG. 3A is an illustration of a PBM Memory structure in one example of the invention. PBM Memory Structure 300 is a linked list of 256 byte segments 302, 304, 306, 308, 310, 312, 314 and 316. In this example segment 302 is the free_head indicating the beginning of the free memory linked list and segment 316 is the free_tail indicating the last segment of free memory.

Figure 3B:
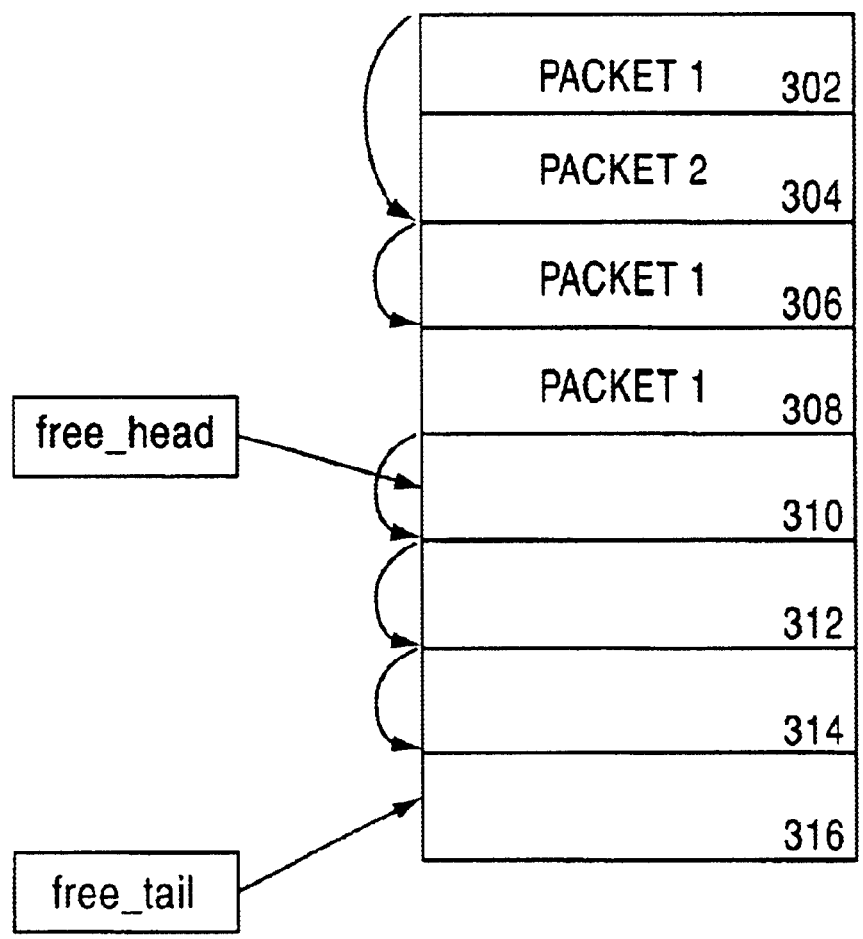
FIG. 3B illustrates a linked list structure of Packet Buffer Memory with two data packets.

In FIG. 3B two packets have been received and stored in the PBM Memory. Packet 1 occupies segments 302, 306 and 308 and packet 2 occupies segment 304. Segments 310, 312, 314 and 316 are free memory. Segment 310 is the free_head indicating the beginning of free memory and segment 316 is the free_tail indicating the end of free memory.

Figure 3C:
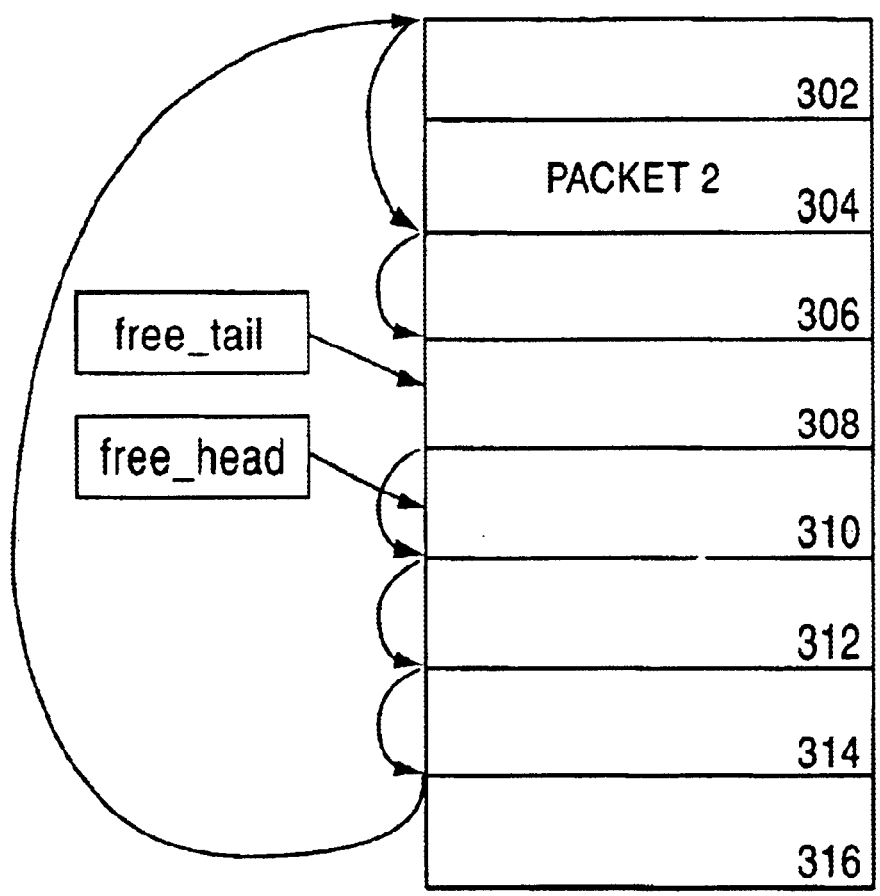
FIG. 3C illustrates a linked list structure of Packet Buffer Memory after the memory occupied by one data packet is freed.

In FIG. 3C packet 1 has been fully transmitted and the Forwarding Manager (FM) has issued a FREE command. Since packet 1 is already in a linked list format the SPM can add the memory occupied by packet 1 to the free memory link list. The free_head, segment 310 remains the same. However, the free_tail is changed. This is accomplished by linking segment 316 to the beginning of packet 1, segment 302, and designating the last segment of packet 1, segment 308, as the free_tail. As a result, there is a linked list starting with segment 310 linking to segment 312, segment 312 linking to segment 314, segment 314 linking to segment 316, segment 316 linking to segment 302, segment 302 linking to segment 306 and segment 306 linking to segment 308 where segment 308 is the free_tail.

Figure 3D:
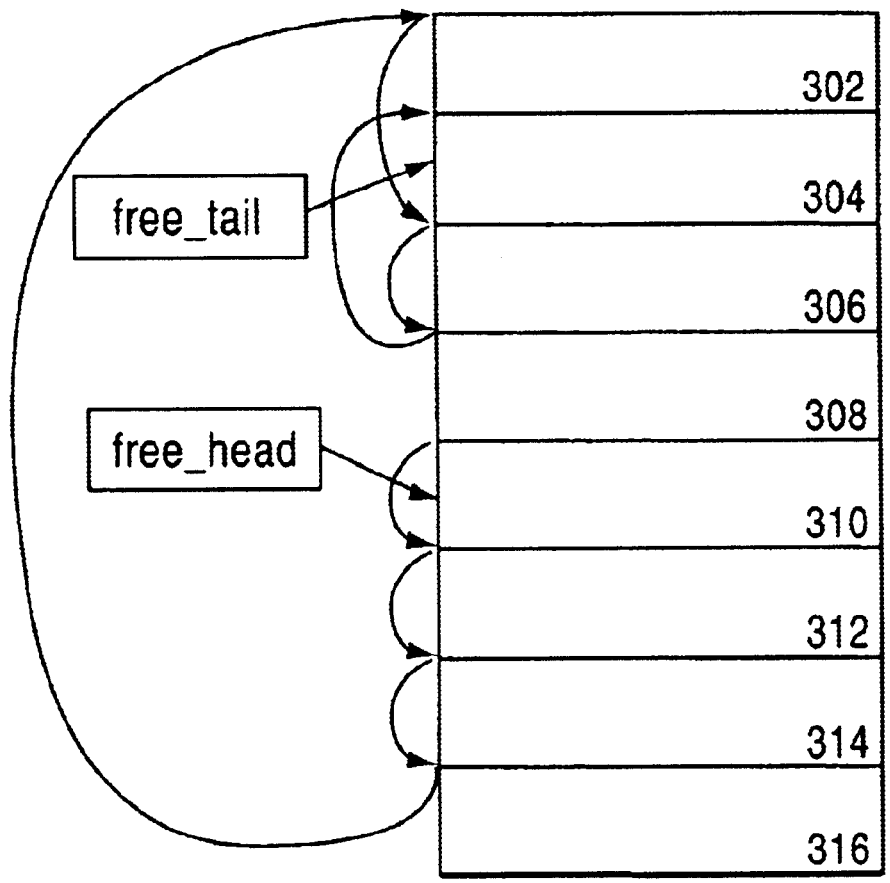
FIG. 3D illustrates a linked list structure of Packet Buffer Memory after the memory occupied by another data packet is freed.

FIG. 3D in this example simply illustrates the PBM Memory after packet 2 has been transmitted successfully and the Forwarding Manager has issued a FREE command over the ATM Bus. The SPM will detect the FREE command and then add the memory space occupied by packet 2 in the PBM Memory to the free memory linked list. In this example segment 308 is linked to the memory occupied by packet 2, segment 304, and segment 304 is identified as the free_tail.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

I claim:

1. A method of flow control management of data packets, said method comprising the steps of:

determining each time data is being written to memory in order to calculate a memory used amount;

determining each time data is being freed from memory in order to calculate a memory freed amount;

calculating how much total memory is being used using said memory freed amount and said memory used amount;

comparing the total memory being used to a first predetermined threshold, wherein when said first predetermined threshold is reached a first threshold command is issued indicating that said first predetermined threshold has been reached; and wherein the memory is implemented as a linked list, with pointers pointing to next memory locations in the linked list and the determining steps are performed when at least one of the pointers is moved.

2. The method as recited in claim 1 wherein said step of determining each time data is being written to memory comprises the step of determining when a command indicating that memory has successfully received a data packet is transmitted over a bus.

3. The method as recited in claim 2 wherein said command is a reception complete command.

4. The method as recited in claim 1, wherein said step of determining each time data is being freed from memory comprises the step of determining when a command indicating that a data packet in memory is no longer needed is transmitted over a bus.

5. The method as recited in claim 4 wherein said command is a memory free command.

6. The method as recited in claim 1, wherein said step of calculating how much total memory is being used by said switch comprises the steps of:

incrementing a counter each time data is being written to memory; and decrementing said counter each time data is being freed from memory, wherein said counter indicates the total memory being used.

7. The method as recited in claim 1, wherein said step of determining each time data is being written to memory comprises the step of:

determining when a reception complete command indicating that memory has successfully received a data packet is transmitted over a bus, wherein said step of determining each time data is being freed from said memory comprises the step of, determining when a memory free command indicating that a data packet in memory is no longer needed is transmitted over a bus; and wherein said step of calculating how much total memory is being used by said memory comprises the steps of, incrementing a counter each time a reception complete command is transmitted over said bus; and decrementing said counter each time a memory free command is transmitted over said bus, wherein said counter indicates how much total memory is being used.

8. The method as recited in claim 1, wherein said first threshold command indicates that memory is becoming full.

9. The method as recited in claim 1, further comprising the step of comparing the total memory being used by said switch to a second predetermined threshold, wherein when said second predetermined threshold is reached a second threshold command is issued indicating that said second predetermined threshold has been reached.

10. The method as recited in claim 9, wherein said second threshold command indicates that data packets will be dropped.

11. A method of flow control management of data packets, said method comprising the steps of:

determining a memory address to which a start pointer is pointing, wherein said start pointer points to a next memory location in a linked list to be read from memory;

determining a memory address to which an end of list pointer is pointing, wherein said end of list pointer points to a last memory location in said linked list;

calculating from said start pointer and said end of list pointer a number of memory addresses which are being used by said linked list to determine a total amount of memory being used;

comparing said total amount of memory being used to a first predetermined threshold, wherein when said first predetermined threshold is reached a first threshold command is issued indicating that said first predetermined threshold has been reached.

12. The method as recited in claim 11, wherein said first threshold command indicates that memory is becoming full.

13. The method as recited in claim 11, further comprising the step of comparing said total amount memory being used by said switch to a second predetermined threshold, wherein when said second predetermined threshold is reached a second threshold command is issued indicating that said second predetermined threshold has been reached.

14. The method as recited in claim 13, wherein said second threshold command indicates that data packets will be dropped.

15. A switch, comprising:
a bus;
a memory interface connected to said bus and to a memory;
a receive port connected to said bus, said receive port receiving data packets for transmission to said memory through said bus and said memory interface;
a transmit port connected to said bus, said transmit port transmitting data packets from said memory through said transmit port out of said switch; and
a flow control manager connected to said bus, said flow control manager comprising,
   a bus monitor that determines when said data packets are being transmitted to said memory and when said data packets are being transmitted from said memory to said transmit port;
   a counter that is incremented each time data packets are transmitted to said memory and decremented each time data packets are transmitted from said memory to said transmit port, wherein said counter indicates a memory being used value; and
   a first comparator that compares said counter to a first predetermined threshold, wherein when said counter meets said first predetermined threshold a first threshold command is transmitted across said bus; and
wherein the memory is implemented as a linked list, with pointers pointing to next memory locations in the linked list.

16. The switch as recited in claim 15, wherein said bus monitor is configured to determine that said data packets are being transmitted to said memory when a reception complete command is transmitted over said bus;
wherein said bus monitor determines that said data packets are being transmitted from said memory to said transmit port when a memory free command is transmitted over said bus; and
wherein said counter is incremented each time said reception complete command is transmitted over said bus and said counter is decremented each time a memory free command is transmitted over said bus.

17. The switch as recited in claim 15, wherein said first threshold command indicates that memory is becoming too full.

18. The switch as recited in claim 15, further comprising a second comparator that compares said counter to a second predetermined threshold, wherein when said counter meets said second predetermined threshold a second threshold command is transmitted across said bus indicating that said second predetermined threshold has been reached.

19. The switch as recited in claim 15, wherein said second threshold command indicates that data packets will be dropped.

20. A switch, comprising:
a bus;
a memory interface connected to said bus and to a memory;
a receive port connected to said bus, said receive port receiving data packets for transmission to said memory through said bus and said memory interface;
a transmit port connected to said bus, said transmit port transmitting data packets from said memory through said transmit port out of said switch; and
a flow control manager connected to said bus, said flow control manager comprising:
   a start pointer determiner that determines a memory address to which a start pointer is pointing to, wherein said start pointer points to the next memory location in a linked list to be read from memory;
   a end of list pointer determiner that determines a memory address to which an end of list pointer is pointing, wherein said end of list pointer points to the last memory location in said linked list;
   a memory used calculator that determines how many memory addresses are being used by said link list to determine a total amount of memory being used; and
   a first comparator that compares said total amount of memory being used to a first predetermined threshold, wherein when said total amount of memory being used meets said first predetermined threshold a first threshold command is transmitted across said bus.

21. The switch as recited in claim 20 wherein said first threshold command indicates that said memory is becoming full.

22. The switch as recited in claim 20 further comprising a second comparator that compares said total amount of memory being used to a second predetermined threshold, wherein when said second predetermined threshold is reached a second threshold command is issued indicating that said second predetermined threshold has been reached.

23. The switch as recited in claim 22 wherein said second threshold command indicates that data packets will be dropped.

* * * * *